Sept. 19, 1944.  C. T. PANKHURST  2,358,734
SPECTACLES
Filed Jan. 19, 1942
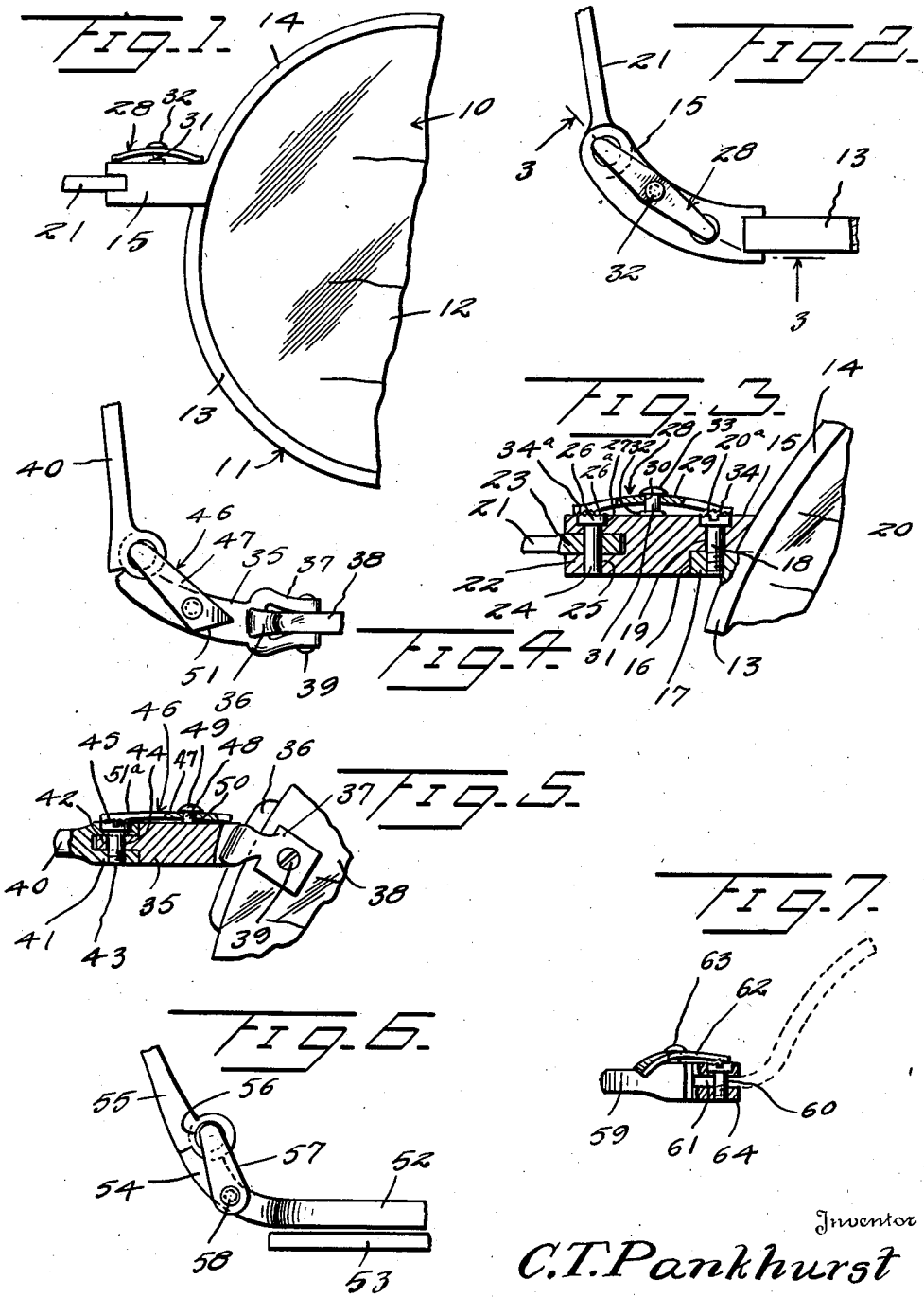
Inventor
C. T. Pankhurst
By Kimmel & Crowell
Attorneys Patented Sept. 19, 1944

2,358,734

UNITED STATES PATENT OFFICE 2,358,734

SPECTACLES

Charles T. Pankhurst, Ionia, Mich.

Application January 19, 1942, Serial No. 427,372

6 Claims. (Cl. 88—41)

This invention relates to spectacles.

At the present time in the construction of spectacles of the rim type where the eyewire is split at the outer portions thereof, the split portions of the eyewire are secured together by means of a screw and each temple bar is pivotally secured to an endpiece by means of a pivot screw. With a construction of this type either one or both of the screws frequently become loosened with resultant loss and/or breakage of the lenses or other damage to the spectacles. It is, therefore, an object of this invention to provide a means whereby a resilient and readily releasable clamping means which is engageable with either one or both of the screws at a side of the spectacles for holding the screws against loosening and against loss will hold the screws tight.

Another object of this invention is to provide in a pair of spectacles of the rim type an improved means for holding the temple bar onto the endpiece, so that the temple bar may be removed or mounted without the use of a screwdriver or other tool.

A further object of this invention is to provide in combination with a pair of spectacles of the rimless type a resilient holding means for holding the temple connection screw against loosening.

A further object of this invention is to provide in a pair of spectacles of the type known to the trade as "Numont" which includes a brow arm on the rear side of each lens, an improved means for holding the temple bar on the outer end of the brow arm, so that the temple connection screw will not become loosened or lost.

A further object of this invention is to provide an improved means for retaining a temple connection screw in applied position which is so constructed that the retaining means may be mounted on either the temple bar or the endpiece.

A further object of this invention is to provide as an attachment for a pair of spectacles of either the rim or rimless type a resilient holding means for either or both the temple connection means and the eyewire connecting means.

A further object of this invention is to provide a device of this kind which may be used with either rim or rimless spectacles of the metal type or may be used with spectacles of the zylonite or shell type.

To the foregoing objects and others which may hereinafter appear, the invention consists of the novel construction, combination and arrangement of parts as will be more specifically referred to and illustrated in the accompanying drawing, but it is to be understood that changes, variations and modifications may be resorted to which fall within the scope of the invention as claimed.

In the drawing:

Figure 1 is a fragmentary front elevation of a pair of spectacles of the rim type having an eyewire connection screw and temple bar pivot retaining means mounted thereon, Figure 2 is a fragmentary top plan of the outer end of the spectacles shown in Figure 1, Figure 3 is a sectional view taken on the line 3—3 of Figure 2, Figure 4 is a fragmentary top plan of the outer end of a pair of spectacles of the rimless type having a temple bar pivot retaining means mounted thereon, Figure 5 is a detail front elevation partly in section of the structure shown in Figure 4, Figure 6 is a fragmentary top plan of a temple bar pivot retaining means mounted on a pair of spectacles of the type known as "Numont," and Figure 7 is a fragmentary front elevation partly in section of a further modification of this invention.

Referring to the drawing and first to Figures 1 to 3 inclusive, the numeral 10 designates generally a pair of spectacles of the rim type which will include a pair of eyewires 11 enclosing a pair of lenses 12, and the eyewires 11 at the central portions will be connected together by means of the usual nose bridge and may be provided with the usual nose pads supported from nose pad arms in the conventional manner.

The eyewire 11 in the present instance is split at its outer portion and includes a lower eyewire section 13 and an upper eyewire section 14. The upper eyewire section 14 has fixedly secured thereto an outwardly extending endpiece 15 which is provided at the inner end portion thereof with a downwardly opening recess 16. The lower eyewire 13 is provided with an outwardly extending ear 17 which is engageable within the recess or socket 16, and an eyewire connection screw 18 is extended through an opening 19 in the endpiece 15 and threaded into the ear 17. The screw 18 is provided with a head 20 which is countersunk in the upper side of the endpiece 15, and the upper surface of the head 20 is left unfinished or roughened as at 20ᵃ.

A temple bar 21 is pivotally secured to the outer end of the endpiece 15 and the endpiece 15 is formed with an inwardly extending slot 22 within which the forward end 23 of the temple bar 21 is adapted to loosely engage. A temple bar pivot member 24 is extended through an opening 25 formed vertically through the endpiece 15 outwardly from the screw 18, and preferably the pivot member 24 is provided with a head 26 at its upper end which is adapted to be countersunk in a recess 27 formed in the upper side of the endpiece 15. The pivot member 24 in the present instance is constructed in the form of a straight pin with a smooth peripheral surface, although if desired, the pivot member 24 may be a conventional screw similar to the screw 18. The head 26 of the pin 24 is roughened or unfinished as at 26$^a$.

In order to provide a means whereby the screw 18 and the pivot member 24 may be retained in applied position, I have provided a resilient screw and pivot retaining member generally designated as 28. The retaining member 28 is constructed in the form of a longitudinally bowed resilient strap 29 formed of spring steel or the like which has the opposite ends thereof overlying the roughened heads 20 and 26 of the screw 18 and the pivot member 24. The strap or retaining member 28 is formed in the center thereof with an opening 30 through which a pin 31 is adapted to loosely engage. The pin 31 is soldered as at 32 to the upper side of the endpiece 15 and is formed with a head 33 at its upper end. The retaining member 28 at the opposite ends thereof is provided with roughened surfaces 34 and 34$^a$ engageable with the roughened surfaces 20$^a$ and 26$^a$ of the heads 20 and 26 respectively, so that the retaining member 28 will be more firmly held against turning on the pin 31.

When the retaining member 28 is in applied position, the opposite ends thereof will resiliently press against the heads 20 and 26 of the screw 18 and the pivot member 24 respectively, and the tension of the retaining member 28 on the screw 18 and the pivot member 24 will resiliently hold the retaining member 28 against rotation with respect to the pin or rivet 31, while at the same time the roughened contacting surfaces of the heads 20 and 26 and the retaining member 28 will also hold the member 28 against accidental turning. When it is desired to remove either the screw 18 or the pivot member 24 or both of these members, the retaining member 28 is rotated to a position where the opposite ends thereof are disengaged with respect to the heads 20 and 26 of the screw 18, and the pivot member 24, respectively, thereby permitting the screw 18 to be loosened or the pivot member 24 to be withdrawn from the endpiece 15.

In Figures 4 and 5 there is disclosed in fragmentary form a pair of spectacles of the rimless type. In this form the endpiece 35 is secured to a lens edge strap 36 and to a pair of lens straps 37. The lens straps 37 engage on opposite sides of the lens 38 and are removably secured by means of a screw 39. The outer end of the endpiece 35 has pivotally secured thereto a temple bar 40 formed with a pair of spaced ears 41 which engage on opposite faces of the outwardly extending ear 42 formed on the outer end of the endpiece 35. A pivot screw 43 is extended through the uppermost ear 41 and is threaded into the lowermost ear 41, passing through an opening 44 which is formed in the ear 42. The screw 43 has the head 45 thereof uppermost and the head 45 is also countersunk into the upper side of the uppermost ear 41.

In order to provide a means whereby the temple bar connection screw 43 may be resiliently held in applied position, I have provided a longitudinally bowed resilient screw retaining or clamping member generally designated as 46. The retaining or clamping member 46 is constructed of a longitudinally bowed strap 47 which is pivotally mounted adjacent the inner end portion thereof on a pivot member 48. The pivot member 48 is provided at its upper end with an upset head 49 engaging the upper side of the strap 47, and the lower end of the pivot member 48 is soldered as at 50 on the upper side of the endpiece 35. The inner end of the strap 47 is cut off on an angle as at 51, so that when the retaining member 46 is in applied or clamping position, the inner end portion thereof will not project beyond the rear or forward side of the endpiece 35. The outer end of the strap 47 is roughened as at 51$^a$ and is adapted to engage on the upper side of the screw head 45, so as to thereby firmly hold the screw 43 against loosening or loss.

Referring now to Figure 6 there is disclosed in fragmentary form a spectacle structure of the type known in the trade as "Numont" which is manufactured by the American Optical Company of Southbridge, Massachusetts. The spectacles shown in Figure 6 include a brow arm 52 which is adapted to engage on the rear side of a lens 53 adjacent the upper edge thereof. The brow arm 52 has formed integral therewith an endpiece 54 and a temple bar 55 is adapted to be pivotally secured to the endpiece 54 by means of a temple connection or pivot screw 56. The temple bar connection screw 56 is clamped against movement or loosening by means of a longitudinally bowed clamping bar 57 which is similar to the clamping bar 46 being pivotally mounted on a headed pivot member 58 which is soldered to the upper side of the endpiece 54.

Referring now to Figure 7 there is disclosed a spectacle construction including a temple bar 59 which is pivotally mounted on a temple bar connection screw 60. The connection screw 60 engages through an endpiece coupling member 61 which may be formed as a part of the spectacle frame structure shown in Figure 6 or of the spectacle endpiece structure shown in Figures 1 to 5 inclusive. The connection screw 60 is resiliently clamped in operative or applied position by means of a longitudinally bowed clamping member 62. The clamping member 62 is pivotally mounted intermediate the ends thereof on a headed pivot member 63 which is secured to the forward end of the temple bar 59 rearwardly from the ears 64 thereof. The clamping member 62 is similar to the clamping member 46 with the exception that the clamping member 62 is mounted on the temple bar 59. The clamping members 57 and 62 are roughened at their outer ends for contact with the heads of the screws 56 and 60, respectively, to thereby hold the clamping members against accidental turning.

The retaining or clamping means hereinbefore described may be made either in combination with or as an attachment for a pair of spectacles which may be formed of either a metal frame or a zylonite or shell frame, or the spectacles may be of the rimless or brow arm type. Furthermore, as disclosed in the drawing, the retaining means for the temple bar pivot connection may be mounted on the endpiece or may be mounted on a temple bar. The clamping member 46, 57, and 62 will normally overlie the temple connection screw or pivot member, so as to yieldingly hold this pivot member against loosening or loss. When it is desired to remove the temple bar connection pivot, the clamping member may be swung to a lateral position, so that the outer end thereof will be disengaged from the head of the temple bar connection pivot.

What I claim is:

1. In a pair of spectacles including an eyewire for each lens, an endpiece, a temple bar pivotally carried by the endpiece, a temple bar connection pivot and an eyewire connection screw, a resilient holding member for said pivot and screw, and means pivotally securing said holding member on the endpiece whereby one end of said member will engage an end of said pivot and the other end of said member will engage said screw.

2. In combination a pair of spectacles including split eyewires, an endpiece an endpiece connection screw engaging said endpiece for holding the split ends of the eyewire together, a temple bar, a headed temple bar connection pivot, a longitudinally bowed resilient retaining member for holding said pivot and screw against endwise movement in one direction, and means fixed relative to the endpiece engaging said retaining member intermediate the ends thereof pivotally mounting said retaining member on the endpiece.

3. In a pair of spectacles including an endpiece member, a temple bar member and a temple bar connection pivot, a resilient elongated longitudinally bowed pivot retaining element having an end thereof engageable against an end of said pivot, and means engageable with said element spaced from said end of said element pivotally mounting said element on one of said members, said means tensioning said element to thereby hold said element in pivot retaining position.

4. In a pair of spectacles including an endpiece member, a temple bar member and a temple bar connection pivot, a resilient elongated longitudinally bowed pivot retaining element having an end thereof engageable against an end of said pivot, said retaining element having a roughened surface engageable with said pivot to hold said retaining element against turning, and means engageable with said element spaced from said end of said element pivotally mounting the said element on one of said members, said means tensioning said element to thereby hold said element in pivot retaining position.

5. In a pair of spectacles including an eyewire for each lens, an endpiece, a temple bar pivotally carried by the endpiece, a temple bar connection pivot and an eyewire connection screw, a resilient holding member for said pivot and screw, and means pivotally securing said holding member on the endpiece whereby one end of said member will engage an end of said pivot and the other end of said member will engage said screw, the opposite ends of said holding member and the adjacent ends of said pivot and screw being provided with roughened surfaces to thereby hold said holding member against turning.

6. An ophthalmic device having endpieces, temples for connection with said endpieces, and headed pivot means engaging said endpieces and said temples for connecting said temples to said endpieces, a longitudinally bowed resilient clamping bar for holding said connecting means against displacement and a stationary pivot for said bar carried by said endpiece, one part of said bar resiliently frictionally engaging said headed pivot means and an intermediate part of said bar resiliently bearing against said stationary pivot for tensioning said bar to thereby hold said headed pivot means in operative position.

CHARLES T. PANKHURST.